United States Patent Office 3,819,835
Patented June 25, 1974

3,819,835
ANTIBIOTIC T-24146 AND PROCESS FOR
PREPARING SAME
Toru Hasegawa, Kawanishi, Teruji Henmi, Amagasaki, Takaaki Kamiya, Takatsuki, and Hidesuke Iwasaki, Itami, Japan, assignors to Takeda Chemical Industries, Ltd., Osaka, Japan
Filed Dec. 14, 1971, Ser. No. 207,851
Claims priority, application Japan, Dec. 14, 1970, 45/111,513
Int. Cl. A61k 21/00
U.S. Cl. 424—122   4 Claims

ABSTRACT OF THE DISCLOSURE

Antibiotic T-24146 is prepared by culturing a microorganism of the genus *Streptomyces*, such as *Streptomyces viridochromogenes* (ATCC 21765), in a culture medium.

---

Figure 1:
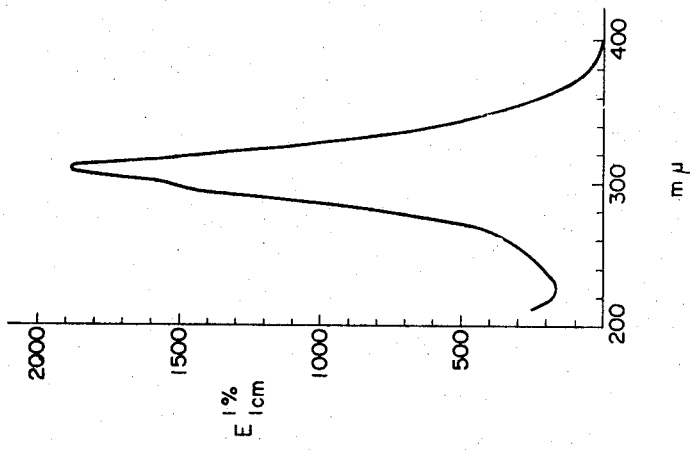

The present invention relates to a novel antibiotic T-24146 and a method for the production of the same.

In search of novel antibiotics, the present inventors have isolated various microorganisms from soil in many different localities to examine the antibiotics they produce. The above search culminated in findings that certain microorganisms produce a novel antibiotic, that the said microorganisms belong to the genus *Streptomyces*, that by cultivating such microorganisms on suitable media, it is possible to cause them to accumulate the said antibiotic in the culture broth and in the mycelium, and that the antibiotic they produced has strong antitrichomonas activity and low toxicity.

The said antibiotic has been named T-24146.

The present invention was accomplished on the basis of the above findings.

Thus, the principal object of the present invention is to provide the novel antibiotic T-24146 useful as an antitrichomonas agent. Another object is to provide a method for production of the novel and useful antibiotic T-24146 by means of microbial cultivation.

For realizing the said objects, those microorganisms belonging to the genus *Streptomyces* and capable of producing the antibiotic T-24146 are employed. These microorganisms include, for examples, strain No. T-24146, which has been isolated from a soil sample of Kyoto, Japan and can be most advantageously used in the present invention.

The microbiological characteristics of this strain are as follows:

(1) MORPHOLOGICAL CHARACTERISTICS

The substrate mycelia show good branching, and their diameter is around 0.8 micron. They form no septum and do not break as in bacillus and coccus during conventional cultivation under aeration and agitation.

Spore-forming mycelia show monopodial branching. They form loops or open or closed spirals at their end and constitute a long chain of ten or more conidia at their ripening stage. The conidium has spiny surface under observation by an electron microscope and is oval or ellipsoidal, ranging from 0.6 x 0.8 to 0.7 x 1.2 micron.

(2) CULTURAL CHARACTERISTICS

In the following description, the color names designated "Rdg." are based on Ridgway's "Color Standards and Color Nomenclature" and the observations are on cultivations at 28° C. for 14 days unless otherwise noted. The abbreviations "G.," "R.," "SP" and "AM" mean "growth," "reverse," "soluble pigment" and "aerial mycelium" respectively.

(a) Czapek's agar:
  G.: Moderate, forming cracks at the bottom part of the slant, spreading smoothly, yellowish brown to dark greenish blue.
  AM: Good, white to Bluish Glaucous (Rdg. XLII, 37′′′-f).
  R.: Greenish Glaucous-Blue (Rdg. XLII, 41′′′-b) to Dark Bluish Glaucous (Rdg. XLII, 37′′′-b).
  SP: None.

(b) Glucose-Czapek's agar:
  G: Abundant, forming wrinkled at the bottom portion of the slant, yellowish brown.
  AM: Abundant, white to Greenish Glaucous-Blue (Rdg. XLII, 41′′′-b).
  R.: Blackish brown to Chaetura Black (Rdg. XLVI, 17′′′′′-m).
  SP: Brown to pale brown.

(c) Glycerin-Czapek's agar:
  G.: Moderate, forming wrinkled at the bottom portion of the slant, brown.
  AM: Slightly poor, powdery, white to Pale Mouse Gray (Rdg. LI, 15′′′′′′-d).
  R.: Blackish Violet-Gray (Rdg. LII, 59′′′′′-m).
  SP: None, or pale brown.

(d) Glucose-asparagine agar:
  G.: Moderate, pale brown to brownish green.
  AM: Moderate, powdery, white to Dawn Gray (Rdg. LII, 35′′′′′-d).
  R.: Olive-Gray (Rdg. LI 23′′′′′-d) to brownish green.
  SP: Greenish brown.

(e) Bouillon (Nutrient broth):
  G.: Surface.
  AM: White to pale brown.
  SP: Brown.

(f) Bouillon agar:
  G.: Moderate, spreading, thin, forming wrinkled at the bottom portion of the slant, pale brown.
  AM: Moderate, powdery, white to Greenish Glaucous-Blue (Rdg. XLII, 41′′′-b).
  R.: Pale brown to brown.
  SP: Brown to dark brown.

(g) Glycerin-bouillon agar:
  G.: Abundant, fine wrinkled on all of the surface, brown.
  AM: Abundant, white to Greenish Glaucous-Blue (Rdg. XLII 41′′′-b).
  R.: Brown to dark brown.

(h) Glucose-bouillon agar:
  G. and AM: Similar to those on glycerin bouillon agar.

(i) Starch agar:
  G.: Moderate, pale brown.
  AM: Moderate, powdery, white to Gnaphalium Green (Rdg. XLVII, 29′′′′-d).
  R.: Pale brown to Olive-Gray (Rdg. LI, 23′′′′′-b), or Grayish Olive (Rdg. XLVI, 21′′′′).
  SP: None, or Light Vinaceous-Fawn (Rdg. XL, 13′′′-d).

(j) Whole egg:
G.: Moderate, spreading over all of the surface, dark brown.
AM: Moderate, powdery, white.
SP: Dark brown.
(k) Yeast extract agar:
G.: Good, wrinkles at the bottom, pale brown.
AM: Abundant, white to Hathi Gray (Rdg. LII, 35'''''-b).
R.: Olive-Brown (Rdg. XL, 17'''-m) to Buffy Brown (Rdg. XL, 17'''-i).
SP: Brown.
(l) Potato plug:
G.: Moderate, brown.
AM: Poor or moderate, white.
SP: Blackish brown.
(m) Carrot plug:
G.: Good, wrinkled, pale brown.
AM: Abundant, white to Hathi Gray (Rdg. LII, 35'''''-b).
SP: Brown.
(n) Litmus milk (37° C.):
G.: In rings, precipitated on the bottom at later growing stage, rapidly peptonized, not coagulated, pale brown, changed to slight acidic.
(o) Gelatin (24° C.):
G.: Moderate, brown.
AM: Poor or none.
SP: Brown, very poor liquefaction.
(p) Löffler's serum (37° C.):
G.: Moderate, wrinkled.
AM: Moderate, white.
SP: Brown, slight liquefaction.
(q) Cellulose:
G.: None or very poor, colorless.
AM: Greenish gray, observed no decomposition of cellulose.
SP: None.
(r) Calcium malate agar:
G.: Moderate, thin, olive.
AM: Moderate, white to Dawn Gray (Rdg. LII, 35'''''-d).
Reverse: Olive-Gray (Rdg. LI, 23'''''-b).
SP: Pale greenish brown.
(s) Tyrosine agar:
G.: Moderate, brown.
AM: Poor, white.
R.: Blackish brown.
SP: Blackish brown.
(t) Peptone agar:
G.: Moderate, thin.
AM: Moderate, powdery, Dawn Brown (Rdg. LII 35'''''-d).
R.: Brown to dark brown.
SP: Pale brown.

(3) PHYSIOLOGICAL CHARACTERISTICS (a) Optimum pH: The pH for growth ranges from 4 to 10, the optimum pH ranges from 7.0 to 8.0.
(b) Optimum temperature: The temperature for growth is 20 to 45° C., the optimum temperature is 30 to 37° C.
(c) Aerobic.
(d) Starch hydrolysis: Positive (growth range: 40 to 42 mm.; enzyme range: 18 to 23 mm.).
(e) Reduction of nitrates (Czapek's liquid medium and peptone broth): Positive.
(f) Chromogenicity: Positive.
(g) Tyrosinase reaction: Positive.
(h) Cellulose decomposition: Negative.

Namely, when the strain No. T-24146 is cultured on synthetic culture media, the substrate mycelia show yellowish brown to greenish brown or sometimes, bluish green, without or with the production of soluble pigments from pale brown to brown. The aerial mycelia are white to Bluish Glaucous (Rdg. XLII, 37'''-f) or Pale Mouse Gray (Rdg. LI, 15'''''-d). When the strain is cultivated on culture media containing proteins, there is observed the production of pale brown to brown soluble pigments. Therefore, the said strain can be classified into chromogenic type. Further the strain shows positive in hydrolysis of starch and in reduction of nitrate, and shows strong peptonization of milk but very weak liquefaction of gelatin.

The following Table 1 shows utilization of carbon sources by the strain, which is observed by cultivation at 28° C. for 10 days after Pridham and Gottlieb's method [Journal of Bacteriology, vol. 59, p. 107 (1948)].

TABLE 1

| | |
|---|---|
| Erythritol | ± |
| Adonitol | + to ++ |
| D-Sorbitol | + |
| i-Inositol | +++ |
| D-Mannitol | +++ |
| Dulcitol | ± |
| D-Xylose | +++ |
| L-Arabinose | + |
| L-Sorbose | ± |
| D-Galactose | +++ |
| D-Glucose | +++ |
| D-Fructose | +++ |
| Rhamnose | +++ |
| Melibiose | +++ |
| Maltose | +++ |
| Sucrose | ++ |
| Lactose | +++ |
| Raffinose | +++ |
| Trehalose | +++ |
| Salicin | ++ to +++ |
| Esculin | + |
| Inulin | + |
| Sodium acetate | + |
| Sodium succinate | ++ |
| Sodium citrate | ++ |
| D-Mannose | +++ |
| Starch | +++ |
| Glycerin | +++ |
| Control | ± |

Remarks: +++, abundant growth; ++, good growth; +, moderate growth; ±, faint growth; −, no growth.

Thus, the carbon sources which are utilizable or well utilized by the *Streptomyces*, strain No. T-24146 include adonitol, D-sorbitol, i-inositol, D-mannitol, D-xylose, L-arabinose, D-galactose, D-glucose, D-fructose, rhamnose, melibiose, maltose, sucrose, lactose, raffinose, trehalose, salicin, esculin, inulin, sodium acetate, sodium citrate, mannose, starch, glycerin, etc. The carbon sources which are substantially not utilizable or not utilized at all by the said strain include erythritol, dulcitol, L-sorbose, etc.

With regard to the afore-mentioned microbiological characteristics of strain No. T-24146, reference to the classification method by Pridham et al. [Applied Microbiology, vol. 6, pp. 52 to 79 (1958)] suggests that Strain No. T-24146 is classified into chromogenic type actinomycetes belonging to a spira-blue group, and reference to Trejo, Bennett [Journal of Bacteriology, vol. 85, pp. 676 to 690 (1963)] suggests that the present strain belongs to the viridochromogenes series.

The following actinomycetes belonging to this series and forming conidia with spiny surface include *Steptomyces viridochromogenes, S. cyaneous, S. chartreusis, S. curacoi, S. glaucescens, S. coerulescens, S. coeruleorubidus, S. coeruleofuscus* and *S. bellus*.

However, it has been pointed out by Trejo, Bennett that the first three microorganisms are different from one another in their reverse color upon growth but that *Streptomyces curacoi* and its following microorganisms listed above cannot be distinguished from one another from a viewpoint of taxonomy, although they produce different antibiotics from one another.

Further, reference to "The Actinomycetes" [S. A. Waksman, vol. 2, p. 152 (1961)] and to "Systimatik der Streptomyceten" [R. Hütter, S. Karger, A.G. (1967)] suggests that strain No. T–24146 is a microorganism resembling *Streptomyces cyaneus*, *Streptomyces chartreusis* and *Streptomyces viridochromogenes*.

However, *Streptomyces cyaneus* is different from the present strain in growth on cellulose, liquefaction of gelatin, reduction of nitrates, reverse color upon growth, etc. The present strain produces greenish brown soluble pigments on glucose-asparagine agar medium and often produces blackish brown and brown soluble pigments on potato plug medium and nutrient agar medium, respectively. On the other hand, *Streptomyces chartreusis* produces yellow soluble pigments on glucose-asparagine agar medium and produces no soluble pigment on potato plug medium and nutrient agar medium, and therefore this species is different from the present strain.

In addition to this, the morphological and cultural characteristics of the present strain are rather identical with those of *Streptomyces viridochromogenes*, which are described in literature references. Thus, for the purpose of comparison, *Streptomyces viridochromogenes* Waksman et Henrici IFO 12337 (ATCC 13759) and the present strain No. T–24146 are cultured under the same conditions, as a result of which there is found no significant difference between the two strains except for a slight difference in growth and aerial mycelium on synthetic media.

From the above facts, the present strain No. T–24146 is taxonomically concluded as belonging to *Streptomyces viridochromogenes*. The present strain No. T–24146 has been deposited at American Type Culture Collection, Maryland, U.S.A. under the accession number ATCC 21765.

Like those of other actinomycetes such as *Streptomyces*, the characteristics of the strains belonging to the species *Streptomyces viridochromogenes* are in general susceptible to mutations, regardless of whether the mutation is caused spontaneously or artificialy, for exampe, with X-ray, ultraviolet ray, or by the action of chemical mutagenic compounds such as nitrogen mustard, nitrosoguanidine or salts of heavy metals. Among those mutants as well as their wild type strains, any one can be employed in the method of the present invention as long as it produces the antibiotic T–24146.

In accordance with the present invention, an antibiotic T–24146-producing microorganism belonging to the genus *Streptomyces* such as *Streptomyces viridochromogenes* No. T–24146 or its mutants is cultivated in a medium containing assimilable carbon sources, digestible nitrogen sources and other nutrients. The culture medium can be liquid or solid, but the liquid medium is more convenient.

As the carbon sources, use is made of, for example, glucose, xylose, galactose, sucrose, glycerin, inositol, mannitol, millet jelly, dextrin, starch, etc. As the nitrogen source, use is made of, for example, peptone, soybean powder, cornsteep liquor, meat extract, rice bran, wheat bran, urea, ammonium salts, and other organic or inorganic nitrogen-containing compounds. Other materials such as inorganic salts including for example sodium chloride, phosphoric acid salts, calcium salts, zinc salts, manganese salts, iron salts and other metal salts may be incorporated into the medium. Further there may be incorporated into the medium, if desired, animal-, vegetable- or mineral oils as an anti-foaming agent.

The cultivation of the T–24146-producing strains in a medium containing those nutrients may be conducted by surface-culture technique, but, more preferably it is conducted by submerged culture under aeration using liquid medium. When *Streptomyces viridochromogenes* No. T–24146 is used as the T–24146-producing strain, for example, the culture period is advantageously from 2 to 5 days. The medium is maintained at a pH between about 5 and 9 preferably around neutral, and the culture temperature lies between about 20 and 45° C., preferably about 24 to 37° C.

For the purpose of recovering the antibiotic T–24146 produced in the culture broth and the mycelia, use may be made of any of conventional techniques which have been employed for separation and recovering of metabolites of microorganisms.

As the present antibiotic T–24146 is a weak acidic lipophilic substance, its recovery can be attained by various techniques by virtue of this property. These techniques include, for example, that using difference in solubility between the antibiotic and impurities, that using difference in absorptive affinity, salting-out technique from a solvent, that using difference in partition coefficient among different solvents and so on. These techniques may be conducted singly or in suitable combination or repeatedly. The antibiotic T–24146 produced is contained in the fluid part of the culture broth and in the mycelia. The portion of the antibiotic contained in the culture filtrate increases as the pH value of the culture broth rises and, on the contrary, the portion of the antibiotic contained in the mycelia increases as the pH value of the culture broth goes down.

The recovering of the antibiotic accumulated in the culture filtrate and the mycelia can advantageously be conducted in any of the following manners; (1) extracting the whole culture broth including the mycelia with a water-insoluble organic solvent under neutral or weakly acidic conditions (at pH 1 to 7, preferably 2 to 5), (2) at first removing mycelia under neutral or weakly acidic conditions and then (a) by treating thus obtained culture filtrate with a water-insoluble organic solvent under the same conditions as before or (b) by treating thus obtained mycelia with a water-insoluble or water-soluble organic solvent under acidic or neutral conditions (at pH 1 to 7, preferably 2 to 5), and (3) at first collecting the mycelia under acidic conditions (at pH 1 to 7, preferably 2 to 5), and extracting the obtained mycelia with a water-soluble or insoluble organic solvent under the same acidic conditions as before and then concentrating the extracted liquid under reduced pressure, and finally by extracting the resultant with a water-insoluble solvent.

The water-insoluble organic solvents usable for aforementioned extractions include fatty acid esters such as ethyl acetate, butyl acetate, etc., ethers such as diethyl ether, halogenated hydrocarbons such as chloroform, dichloromethane, etc., aromatic hydrocarbons such as benzene, toluene, etc., alcohols such as butanol, ketones such as methyl isobutyl ketone, etc., and the water-soluble organic solvents include ketones such as acetone, alcohols such as methanol, ethanol, etc. The extracted liquid obtained by any of the above manners is washed with dilute acid such as dilute hydrochloric acid, dilute sulfuric acid, etc. to remove basic impurities and then washed with weak basic substance such as sodium bicarbonate solution, potassium bicarbonate solution, dilute aqueous ammonium solution, etc. to remove other impurities. Then, the organic solvent layer is washed with water, and dehydrated, concentrated under reduced pressure at low temperature and to the resultant is added a low polar organic solvent such as *n*-hexane, cyclohexane, petroleum benzin, petroleum ether, etc., whereby there is obtained a crude antibiotic T–24146.

The crude antibiotic is crystallized by using a suitable organic solvent. For example, the active ingredient is dissolved in a suitable amount of chloroform or ethyl acetate, while the impurities non-soluble in said solvent are removed by filtration, and to the resultant mixture is added a solvent, the solubility of the active ingredient in such solvent being low, such as *n*-hexane, petroleum ether, methanol, etc., whereby the antibiotic T–24146 is crystallized.

The crude antibiotic T-24146 can be purified also by using a suitable absorbent. As the absorbent, use may be made of silica gel, alumina, Sephadex (Pharmacia, Sweden) Florisil (activated magnesium silicate, Floridin Co., U.S.A.), etc.

These absorbents are advantageously pre-treated with a suitable acid such as oxalic acid or hydrochloric acid in order to regulate the activity of the absorbent at a suitable degree.

As an eluting solvent, use may be made of chloroform, ethyl acetate, benzene, methanol, etc. singly or in a suitable combination. The absorbent can be put into use in the form of conventional column-chromatography or thin-layer chromatography.

Thus produced antibiotic T-24146 shows generally the following characteristics:

PHYSICOCHEMICAL PROPERTIES OF THE ANTIBIOTIC T-24146

(1) Melting point: 168 to 173° C. (decomposition).
(2) Elementary analysis: C, 71.16 to 72.68; H, 6.41 to 7.01; N, 2.35 to 2.67; O, 17.11 to 18.48.
(3) Molecular weight:
  (a) Vapor pressure osmosis method: 535±50 (in ethyl acetate);
  (b) Titration method: about 550 [in a solution of dimethylsulfoxide-water (7:2)].
(4) Specific rotation: $[\alpha]_D^{25} = +872° \pm 80°$ (C.=0.5% in chloroform).
(5) Ultraviolet ray absorption spectrum: As shown in FIG. 1:

$\lambda_{max}^{MeOH}$: about 310 m$\mu$, e.g. 310 ± 2 m$\mu$, more particularly 309 to 310 m$\mu$.

$E_{1\,cm}^{1\%}$: 1779 to 2180.

Figure 2:
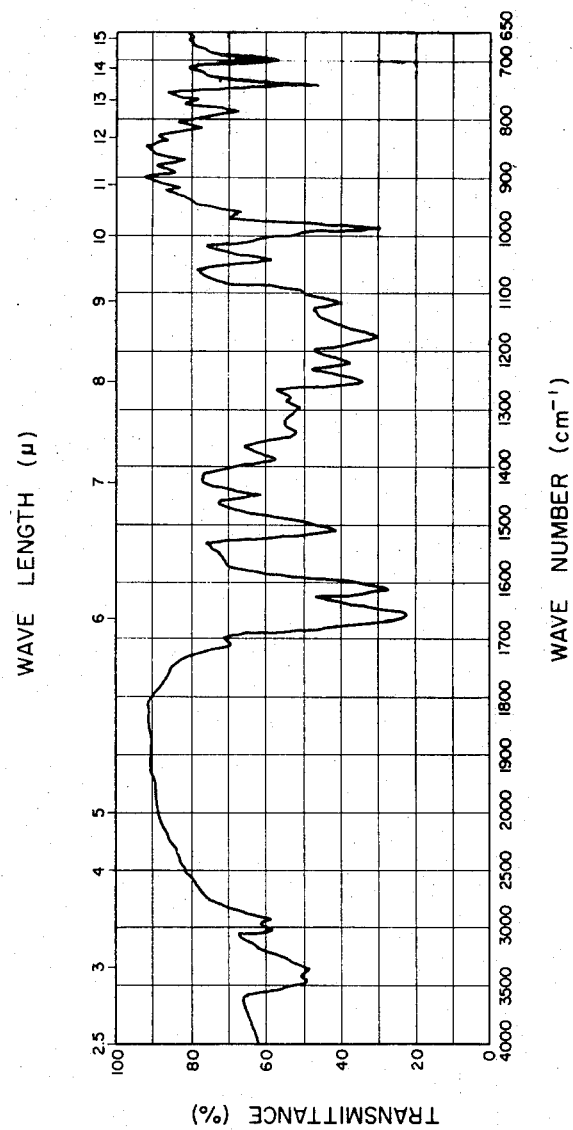

(6) Infrared absorption spectrum (in KBr): As shown in FIG. 2, the principal significant absorption band in wave numbers (cm.$^{-1}$) are as follows: 3470, 3340, 3000, 2910, 1650, 1610, 1510, 1450, 1385, 1300, 1250, 1218, 1175, 1125, 1040, 987, 960.
(7) Solubility:
  Easily soluble in chloroform, ethyl acetate;
  Soluble in methanol, ethanol, acetone, diethyl ether, benzene;
  Hardly soluble or insoluble in water, $n$-hexane, petroleum ether.
(8) Color reaction:
  (a) Potassium permanganate solution: decolorized;
  (b) Ferric chloride reagent: positive;
  (c) Dragendorff reaction: positive;
  (d) Ninhydrin reagent: negative.
(9) PKa' [in a solution of dimethylsulfoxide-water (7:2)]: about 9, e.g. 8.9±0.4, more particularly 8.7 to 9.1.
(10) Color: pale yellow to white.
(11) Thin-layer chromatography:
  (a) Developing solvent: benzene-chloroform-methanol (70:28:2);
  (b) Thin-layer: silica gel Spot Film (Tokyo Kasei Co., Japan), immersed in 5 weight percent methanol solution of oxalic acid, washed with methanol and dried at room temperature.
  (c) Detection method: Bioautography using *Bacillus subtilis*.
  (d) R$f$ value: 0.25.

BIOLOGICAL PROPERTIES (1) Antimicrobial spectrum: Antimicrobial spectrum of T-24146 is examined by agar dilution method. Result is shown in Table 2.

TABLE 2

| Test strain | MIC T-24146 | MIC Metronidazole | MIC Trichomycin | Medium |
|---|---|---|---|---|
| *Esherichia coli* IFO-3044 | >100 | | | 1 |
| *Proteus vulgaris* IFO-3045 | >100 | | | 1 |
| *Pseudomonas aeruginosa* IFO-3080 | >100 | | | 1 |
| *Staphylococcus aureus* 209P | 0.5–1.0 | >250 | >250 | 1 |
| *Bacillus subtilis* PCI 219 | 0.05 | | 250 | 1 |
| *Bacillus cereus* IFO 3466 | 5–10 | | | 1 |
| *Bacillus brevis* IFO 3331 | 2–5 | | | 1 |
| *Sircina lutea* IFO 3232 | 2–5 | | | 1 |
| *Micrococcus flavus* | 5–10 | | | 1 |
| Mycobacterium IFO 3153 | 50–100 | | | 2 |
| *Mycobacterium smegmatis* IFO 3083 | 50 | | | 2 |
| *Mycobacterium phlei* IFO 3158 | 20 | | | 2 |
| Mycobacterium sp. 607 | 50–100 | | | 2 |
| *Mycobacterium bovis* BCG | 25 | | | 3 |
| *Penicillium chrysogenum* | 20–50 | >250 | | 4 |
| *Saccharomyces cerevisiae* | >100 | | | 4 |
| *Candida albicans* | 50 | >250 | 0.2–1.56 | 4 |
| *Aspergillus niger* | 100 | >250 | | 4 |
| *Trichophyton mentagrophytes* | 10–20 | | | 4 |

Remarks:
MIC=Minimum inhibitory concentration.
Medium 1=Bouillon agar, at 37° C. for 20 hours.
Medium 2=Glycerin bouillon agar, at 37° C. for 40 hours.
Medium 3=Kirchner-albumin,* at 37° C. for 2 weeks.

*Kirchner-albumin:

| | Weight percent |
|---|---|
| Sodium dihydrogen phosphate | 0.3 |
| Potassium dihydrogen phosphate | 0.4 |
| Magnesium sulfate | 0.06 |
| Sodium citrate | 0.25 |
| L-aspartic acid | 1.0 |
| Glycerin | 2.0 |
| Horse serum | 10.0 |

Medium 4=Glucose-bouillon agar, at 28° C. for 48 hours.

(2) Anti-protozoa activity: Anti-trichomonas activity is tested by a liquid medium dilution method. Result is shown in Table 3–1.

Test protozoa: *Trichomonas vaginalis* No. 4F.
Medium: SYS medium [1] adjusted at pH 5.6, at 37° C., for 40 hours.

[1] SYS medium:

| | Weight percent |
|---|---|
| L-cystein | 0.2 |
| Sodium chloride | 0.5 |
| Glucose | 1.0 |
| Yeast extract | 1.0 |
| Peptone | 2.0 |
| Horse serum | 10.0 |

TABLE 3–1

| Concentration, mcg./ml.: | Degree of growth inhibition |
|---|---|
| 0.5 | — |
| 0.25 | — |
| 0.125 | — |
| 0.062 | — |
| 0.031 | ++ |
| 0.015 | +++ |

Remarks: —, complete growth-inhibition; ++, slight growth-inhibition; +++, normal growth.

The comparison of anti-trichomonas activity of the antibiotic T-24146 with other substances showing anti-trichomonas activity is shown in Table 3–2.

TABLE 3–2

| Protozoa substance: | *Trichomonas vaginalis* No. 4F, MIC (mcg./ml.) |
|---|---|
| T-24146 | 0.062 to 0.125. |
| Metronidazole | 0.625 to 1.25 (0.2 to 0.3).[1] |
| Trichomycin | 2 to 3 (0.78 to 6.25).[2] |

Remark: 1, 2—the value described in literatures.

(3) Acute toxicity (LD$_{50}$ in mice): Acute toxicity (LD$_{50}$ in mice) is shown in Table 4.

TABLE 4

| Method for administration | Substance (mg./kg.) T-24146 | Metronidazole | Trichomycin |
|---|---|---|---|
| Oral administration | >10,000 | 4,300 | 160–830 |
| Hypodermic injection | >1,000 | | |

(4) Comparison with known antibiotics: The present antibiotic T-24146 is characterized by significant absorption at about 310 mμ in the ultraviolet ray absorption spectrum, and therefore the present antibiotic is compared with known antibiotics which show significant absorption around 310 mμ in the ultraviolet ray absorption spectrum. Results are shown in Table 5.

TABLE 5

| Name of antibiotic | T-24146 | Dena-mycin | Akita-mycin | Peresi-mycin |
|---|---|---|---|---|
| Melting point, °C | [1] 168-173 | 226-228 | [1] 180 | 145 |
| $[\alpha]_D$ | +872±80° | +41° | +88° | +695° |
| Elementary analysis: | | | | |
| C | 71.16-72.68 | 68.26 | 57.26 | 44.03 |
| H | 6.41-7.01 | 8.71 | 7.68 | 8.31 |
| N | 2.35-2.67 | 0 | 1.64 | 8.56 |
| Maximum U.V. absorption: | | | | |
| MEOH max | 310 | 311 | 291, 304, 319 | 309 |
| E 1% 1 cm | 1,779-2,180 | 520 | 600, 700, 640 | 278 |
| Anti-protozoa activity, mcg./ml | MIC: 0.062 | [2] | MIC:12.5 | [2] |

[1] Decomposition. [2] Not described.

From the above comparison, the antibioltic T-24146 is concluded as a novel one.

As shown in the data afore-mentioned, the antibiotic T-24146 shows effective antimicrobial activity against gram-positive microorganisms, particularly against *Bacillus subtilis*, *Staphylococcus aureus* and shows effective anti-protozoa activity against *Trichomonas vaginalis*. Thus the antibiotic T-24146 is useful for treatment of infections caused by *Bacillus subtilis*, *Staphylococcus aureus* or *Trichomonas vaginalis* such as colpitis trichomonadis and cystitis trichomonadis.

The antibiotic T-24146 can be used orally, parenterally or externally in a suitable pharmaceutical form such as powder, tablets, vaginal tablet, injections, suppository, vaginal suppository or ointment, admixed with a pharmaceutically acceptable inert carrier.

Thus, useful preparations for oral or external application to infections due to the microorganisms aforementioned are, for example, as follows:

(a) Tablet for oral administration:

Prescription: G.
T-24146 _____ 50.0
Lactose _____ 124.5
Corn-starch _____ 60.0
Corn-starch _____ 12.0
Gelatin _____ 3.0
Magnesium stearate _____ 0.5

Total _____ 250.0

T-24146, lactose and corn-starch are mixed, to which are added paste of corn-starch and gelatin, followed by mixing. The whole mixture is subjected to sieving with 12-mesh sieve, and the resultant is dried under 40° C. and vacuum. The resulting granules are subjected to sieving with 20-mesh sieve. To the resulting granules is added magnesium stearate, and the mixture is formed into a tablet, which is 8.5 mm. diameter and 0.25 g. weight.

(b) Vaginal tablet:

Prescription G.
T-24146 _____ 50
Sodium bicarbonate _____ 235
Tartaric acid _____ 180
Saponin _____ 15
Methylcellulose (4000 c.p.s.) _____ 8
Hardened fatty oil _____ 12

Total _____ 500

The all components described in the said Prescription are mixed and subjected to sieving with 60-mesh seive. The resulting granules are formed into an oval-type tablet, which is 16 mm. long diameter, 8 mm. short diameter and 0.5 g. weight.

The dose of the antibiotic T-24146 to be administered varies with the conditions of diseases, etc., and generally falls within the range of from about 150 mg. to about 300 mg. for oral administration, from about 100 mg. to about 200 mg. for parenteral administration and from about 50 mg. to about 100 mg. for external administration for adult human per day.

For further explanation of the present invention, the following Examples are given, wherein the word "part(s)" is based upon weight unless otherwise noted and relationship between "part(s)" and "volume part(s)" corresponds to that between "gram(s)" and "milliliter(s)."

EXAMPLE 1

A 200 volume parts capacity culturing vessel is charged with 40 volume parts of a culture medium composed of:

Weight percent
Glucose _____ 2.0
Soluble starch _____ 3.0
Soybean flour _____ 1.0
Corn steep liquor _____ 1.0
Peptone _____ 0.5
Sodium chloride _____ 0.3
Ferrous sulfate _____ 0.05
Calcium carbonate _____ [1] 0.5

[1] pH 7.0.

The vessel is sterilized under 1.5 atmospheric pressure for 30 minutes. After cooling, the medium is inoculated with a loop of mycleium of *Streptomyces viridochromogenes* No. T-24146 which is previously cultured in glucose-asparagin agar at 28° C. for 8 days. Thus inoculated vessel is incubated at 28° C. for 72 hours using a rotary shaker at 220 r.p.m. The culture broth is filtered. The filtrate thus obtained can inhibit completely the growth of *Trichomonas vaginalis* No. 4F even in a concentration of 400 times dilution.

EXAMPLE 2

A 200 volume parts capacity culturing vessel is charged with 40 volume parts of a seed culture medium composed of:

Weight percent
Glucose _____ 2.0
Soluble starch _____ 3.0
Soybean flour _____ 1.0
Corn steep liquor _____ 1.0
Peptone _____ 0.5
Sodium chloride _____ 0.3
Calcium carbonate _____ [1] 0.5

[1] pH 7.0.

The vessel is sterilized under 1.5 atmospheric pressure for 15 minutes. After cooling, the medium is inoculated with a loop of mycelium of *Streptomyces viridochromogenes* No. T-24146 which is previously cultured in glucose-asparagin agar at 28° C. for 8 days.

Thus inoculated vessel is incubated in the same way as in Example 1 at 28° C. for 48 hours. The culture broth is inoculated in an amount of 2.5% relative to 40 volume parts of the main culture medium having the following composition, which is previously charged in a 200 volume parts-capacity culture vessel, followed by sterilization:

Weight percent
Glucose _____ 2.0
Glycerin _____ 1.0
Soluble starch _____ 2.0
Soybean flour _____ 1.0
Corn steep liquor _____ 1.0
Cotton seed meal _____ 1.0
Peptone _____ 0.5
Sodium chloride _____ 0.3
Calcium carbonate _____ [1] 0.5

[1] pH 7.0.

Thus inoculated vessel is incubated at 28° C. for 120 hours using a rotary shaker at 220 r.p.m.

The culture broth is recovered and filtered. The filtrate can inhibit completely the growth of *Trichomonas vaginalis* No. 4F even at a concentration of 800 to 1000 times dilution.

EXAMPLE 3

A 2000 volume parts capacity culturing vessel is charged with 500 volume parts of the same seed culture medium as Example 2, and sterilized under 1.5 atmospheric pressure for 15 minutes. After cooling, the medium is inoculated with *Streptomyces viridochromogenes* No. T–24146, and cultivation is conducted on a reciprocal shaker at 28° C. for 48 hours. Thus obtained seed culture broth is inoculated in an amount of 1.5% relative to 30,000 volume parts of the same main culture medium as Example 2 which is previously charged in a 50,000 volume parts-capacity culturing vessel. Thus inoculated vessel is incubated at 28° C. for 90 hours using a stirrer at 280 r.p.m. with blowing air at a rate of 100%/min. To the culture broth is added Hyflo Supercel (Johns-Manville, U.S.A.), followed by filtration. To 20,000 volume parts of thus obtained filtrate is added dilute hydrochloric acid so as to adjust pH value at 4. The filtrate is then extracted with 10,000 volume parts of ethyl acetate and with 5,000 volume parts of ethyl acetate. The ethyl acetate layers are combined and washed with 3,000 volume parts of 2 weight percent sodium bicarbonate solution, 2,000 volume parts of 2 weight percent sodium bicarbonate solution and 5,000 volume parts of water, followed by drying over anhydrous sodium sulfate. Thus obtained dry ethyl acetate solution is concentrated under reduced pressure, and to the residue is added petroleum ether and the mixture is filtered. This procedure gives 4 parts of crude powder.

The power is dissolved in a small amount of a mixture of chloroform and methanol (20:1), the insolubles are removed by filtration, and to the filtrate is added methanol, whereby 1 part of crystalline powder of T–24146 is obtained. Minimum inhibitory concentration of this crystalline powder against *Trichomonas vaginalis* No. 4F is 0.062 to 0.125 mcg./ml.

EXAMPLE 4

A seed culture broth, which is obtained using the same medium as in Example 2 under the same conditions as in said Example, is inoculated in an amount of 1.5% relative to 30,000 volume parts of the main culture medium having the following compositions, which is previously charged in a 50,000 volume parts capacity culture vessel:

| | Weight percent |
|---|---|
| Glucose | 2.0 |
| Soluble starch | 3.0 |
| Soybean flour | 1.0 |
| Corn steep liquor | 1.0 |
| Peptone | 0.5 |
| Sodium chloride | 0.3 |
| Calcium carbonate | [1] 0.5 |

[1] pH 7.0.

Thus inoculated vessel is incubated at 28° C. for 24 hours using a stirrer at 280 r.p.m. with blowing air at a rate of 100%/min. 10,000 volume parts of the resulting culture broth is inoculated in 100,000 volume parts of the same medium as Example 2, which is previously charged in a 200,000 volume parts-capacity culture vessel. Thus inoculated vessel is incubated at 28° C. for 90 hours using a stirrer at 200 r.p.m. with blowing air at a rate of 100%/min. The culture broth is recovered and Hyflo Supercel is added to the same, followed by filtration. To 70,000 volume parts of the resulting filtrate is added dilute hydrochloric acid to adjust pH value at 4. The resultant is extracted with 20,000 volume parts of ethyl acetate and with 15,000 volume parts of ethyl acetate. The ethyl acetate layers are combined, washed twice with each 10,000 volume parts of water and concentrated to about 2,000 volume parts under reduced pressure. The concentrated liquid is washed with 1,000 volume parts of 5 weight percent sodium bicarbonate solution and with 500 volume parts of 5 weight percent sodium bicarbonate solution, washed with water, followed by drying over anhydrous sodium sulfate. After evaporation of ethyl acetate under reduced pressure, the residue is washed with petroleum ether to give 10 parts of crude powder. The powder is dissolved in a small amount of ethyl acetate and petroleum ether is added thereto, and the mixture is kept standing in a cool place. This procedure gives 3 parts of crystalline powder. The crystalline powder shows the minimum inhibitory concentration of 0.062 to 0.125 mcg./ml. against *Trichomonas vaginalis* No. 4F.

EXAMPLE 5

To about 90,000 volume parts of a culture broth obtained by the same manner as in Example 4 in added Hyflo Supercel, followed by filtration. To about 70,000 volume parts of the filtrate is added dilute hydrochloric acid, and the solution is, after adjusting at pH 2, extracted with 20,000 volume parts of ethyl acetate and with 15,000 volume parts of the same.

On the other hand, to about 20,00 parts of the mycelia containing Hyflo Supercel are added 5,000 volume parts of water and dilute hydrochloric acid, and the mixture is, after adjusting at pH 2, extracted with 20,000 volume parts of ethyl acetate and 15,000 volume parts of the same.

The whole extracts obtained above are combined and washed with 30,000 volume parts of dilute aqueous ammonium solution and with 30,000 volume parts of water, followed by concentration under reduced pressure. To the residue is added *n*-hexane and the mixture is kept in a cold place. The resulting precipitates are recovered to obtain 60 parts of a crude powder, which shows the minimum inhibitory concentration of 0.125 mcg./ml. against *Trichomonas vaginalis* No. 4F.

EXAMPLE 6

To about 90,000 volume parts of a culture broth obtained by the same manner as in Example 4 are added Hyflo Supercel and dilute hydrochloric acid.

The mixture is adjusted at pH 2 and mixed with 70,000 volume parts of ethyl acetate, followed by agitation for 1 hour.

The resultant is filtered and the ethyl acetate layer of the filtrate is recovered and washed with 20,000 volume parts each of dilute aqueous ammonium solution and water, followed by removal of the solvent under reduced pressure.

To the residue is added *n*-hexane and the mixture is kept in a cold place. The resulting precipitates are recovered to give 50 parts of a crude powder, which shows the minimum inhibitory concentration of 0.125 mcg./ml. against *Trichomonas vaginalis* No. 4F.

EXAMPLE 7

To about 90,000 volume parts of a culture broth obtained by the same manner as in Example 4 are added Hyflo Supercel and dilute sulfuric acid. The mixture is adjusted at pH 4, agitated for 30 minutes and filtered. To about 20,000 parts of the mycelia thus obtained, which contain Hyflo Supercel, is added 50,000 volume parts of ethyl acetate containing 1 weight percent of oxalic acid, and the mixture is stirred for 1 hour and filtered. The filtrate is washed with 20,000 volume parts each of a dilute aqueous ammonium solution and water, followed by concentration under reduced pressure. To the residue is added *n*-hexane and the mixture is kept in a cold place. The resulting precipitates are recovered to give 70 parts of a crude powder, which shows the minimum inhibitory concentration of 0.125 mcg./ml. against *Trichomonas vaginalis* No. 4F.

EXAMPLE 8

10 parts of the crude powder obtained in Example 4 is dissolved in the lower portion of a solvent system consisting of n-hexane and methanol (5:2). The solution is washed three times with the same amount of the upper portion of the above solvent system. Thus treated lower portion is concentrated to dryness under reduced pressure to give 9 parts of crystalline powder. To the crystalline powder is added methanol, followed by admixing, whereby 3 parts of crude crystal is obtained. This crystal shows the minimum inhibitory concentration of 0.062 mcg./ml. against *Trichomonas vaginalis* No. 4F.

EXAMPLE 9

1 part of the crystalline powder obtained in Example 3 is dissolved in 25 volume part sof chloroform-methanol (20:1) and the insolubles are removed. The solution is used as a sample solution. On the other hand, 100 parts of silica gel (manufactured by Merck & Co., W. Germany, 70 to 325 mesh) is suspended in 200 volume parts of ethyl acetate containing 1 weight percent of oxalic acid, followed by agitation and filtration. The resultant is washed well with ethyl acetate and dried at room temperature. Thus impregnated silica gel is packed in a column using chloroform for column chromatography. The above sample solution is flowed on the column, and then elution is conducted by flowing continuously a solvent, the solvent being at first chloroform and lastly chloroform-methanol (9:1) during which time an amount of methanol is continuously increased. Among the eluates, the fractions showing high activity against *Trichomonas* and *Bacillus subtilis* are collected, and washed with water, dried and concentrated to dryness under reduced pressure. The residue is recrystallized from chloroform-methanol to give about 0.5 part of crystal of T–24146 showing the following properties:

Melting point: 168 to 173° C. (decomposition).
Elementary analysis: C, 71.16, 72.68; H, 6.41, 6.93; N, 2.38, 2.67; O, 17.11, 17.61.
Molecular weight:
  (a) Vapor pressure osmosis method: 535±50 (in ethyl acetate);
  (b) Titration method: about 550 [in a solution of dimethylsulfoxide-water (7:2)].
Specific rotation: $[\alpha]_D^{25} = +872 \pm 80°$ C. (C.=0.5%, in chloroform).
Ultraviolet ray absorption spectrum: maximum absorption $$\lambda_{max.}^{MeOH} = 309 \text{ m}\mu; \text{ absorbance } E_{1cm.}^{1\%} = 1879 + 200$$

Infrared absorption spectrum (in KBr): principal significant absorption bands in wave number (cm$^{-1}$) are as follows: 3470, 3340, 3000, 2910, 1650, 1610, 1510, 1450, 1385, 1300, 1250, 1218, 1175, 1125, 1040, 987, 960.
Solubility:
  Easily soluble in chloroform, ethyl acetate;
  Soluble in methanol, ethanol, acetone, diethyl ether, benzene;
  Hardly soluble or insoluble in water, n-hexane, petroleum ether.
Color reaction:
  (a) Potassium permanganate solution; decolorized;
  (b) Ferric chloride reagent: positive;
  (c) Dragendorff reaction: positive;
  (d) Ninhydrin reagent: negative.
PKa' value: 9.1 [in a solution of dimethylsulfoxide-water (7:2)].
Color: pale yellow.

Thin-layer chromatography:
  (a) Developing solvent: benzene-chloroform-methanol (70:28:2);
  (b) Thin-layer: silicagel Spot Film (Tokyo Kasei Co., Japan), immersed in 5 weight percent methanol solution of oxalic acid, washed with methanol and dried at room temperature;
  (c) Detection method: Bioautography using *Bacillus subtilis*;
  (d) R$f$ value: 0.25.

Anti-trichomonas activity: minimum inhibitory concentration against *Trichomonas vaginalis* No. 4F: 0.062 mcg./ml.

EXAMPLE 10

Silica gel plate (manufactured by Merk & Co., W. Germany, 0.2 x 20 x 20 cm.) is immersed in 5 weight percent oxalic acid solution in methanol, and washed with methanol and dried at room temperature. 0.03 part of the crude crystal obtained in Example 8 is dissolved in a small amount of chloroform-methanol (20:1), and applied in a straight line on the bottom portion of the plate. As the developer, benzene - chloroform-methanol (70:80:2) is used. The silica gel at the portion of R$f$ value of around 0.2, which shows activity against *Trichomonas* and *Bacillus subtilis*, is scratched out and extracted with ethyl acetate. The extract is washed with water and dried over anhydrous sodium sulfate, followed by removing the solvent. The residue is recrystallized from chloroform-methanol to give about 0.015 part of crystal of T–24146.

EXAMPLE 11

0.5 part of the crystalline powder obtained in Example 3 is dissolved in a small volume of tetrahydrofuran and the solution is passed on a column packed with 500 parts of Sephadex LH–20 (manufactured by Pharmacia, Sweden) which is impregnated with oxalic acid. The column is eluted with tetrahydrofuran. The fractions showing anti-trichomonas activity are collected, concentrated under reduced pressure and washed with methanol. This procedure gives 0.3 part of pale yellow powder.

The powder is crystallized from chloroform-methanol and recrystallized from tetrahydrofuran-methanol, whereby there is obtained 0.2 part of colorless plates showing the following properties;

Melting point: 168 to 170° C. (decomposition).
Elementary analysis: C, 71.63, 71.87; H, 6.81, 6.82; N, 2.35, 2.36; O, 18.44.
Molecular weight: vapor pressure osmosis method: 548 (in ethyl acetate).
Specific rotation: $[\alpha]_D^{23} = +878°$ (C.=0.52%, in chloroform).
PKa' value: 8.8 [in a solution of dimethylsulfoxide and water (77:22)].
Ultraviolet ray absorption spectrum: maximum absorption $$\lambda_{max.}^{MeOH} = 311 \text{ m}\mu; \text{ absorbance } E_{1cm.}^{1\%} = 2120$$

Anti-trichomonas activity: minimum inhibitory concentration against *Trichomonas vaginalis* No. 4F: 0.062 mcg./ml.

EXAMPLE 12

50 parts of the crystalline powder obtained in Example 3 is dissolved in a small amount of tetrahydrofuran-ethyl acetate (1:3) and this solution is passed on a column with 700 parts of alumina (manufactured by Merk & Co., W. Germany, activity: II to III) which is previously impregnated with oxalic acid. The column is eluted with ethyl acetate.

The fractions showing strong absorption of ultraviolet ray at around 310 m$\mu$ are collected, washed with water, dried, concentrated under reduced pressure, and the residue is washed with methanol. This procedure gives 25 parts of pale yellow powder. This powder is crystallized from chloroform-methanol and then recrystallized from tetrahydrofuran-methanol to give 20 parts of colorless plates showing the following properties:

Melting point: 168 to 170° C. (decomposition).
Elementary analysis: C, 72.14, 72.06; H, 6.95, 6.94; N, 2.38, 2.35; O, 17.77.
Molecular weight: vapor pressure osmosis method: 566 (in ethyl acetate).
Specific rotation: $[\alpha]_D^{32} = +893.3°$ (C.=0.51%, in chloroform).
PKa' value: 8.8 [in a solution of dimethylsulfoxide-water (77:22)].
Ultraviolet ray absorption spectrum: maximum absorption $\lambda_{max.}^{MeOH} = 311$ m$\mu$; absorbance $E_{1\,cm.}^{1\%} = 2160$ Anti-trichomonas activity: minimum inhibitory concentration against *Trichomonas vaginalis* No. 4F: 0.062 mcg./ml.

EXAMPLE 13

50 parts of the crude powder obtained in Example 3 is dissolved in a small amount of tetrahydrofuran-ethyl acetate (1:3), and the solution is passed on a column packed with 1,500 parts of silica gel (manufactured by Merk & Co., W. Germany, 70 to 325 mesh). The column is eluted with ethyl acetate. The fractions showing strong absorption of ultraviolet ray at around 310 m$\mu$ are collected, washed with water, dried, concentrated under reduced pressure and washed with methanol. This procedure gives 30 parts of yellowish brown powder. This powder is crystallized from chloroform-methanol and then recrystallized twice from tetrahydrofuran-methanol to give 20-parts of colorless plates showing the following properties:

Melting point: 169 to 172° C. (decomposition).
Elementary anlaysis: C, 71.70, 72.09; H, 6.91, 7.01; N, 2.37, 2.42; O, 18.48.
Molecular weight: vapor pressure osmosis method: 541 (in ethyl acetate)
Specific rotation: $[\alpha]_D^{32} = +892.8°$ (C.=0.5%, in chloroform).
PKa' value: 8.7 [in a solution of dimethylsulfoxide-water (77:22)].
Ultraviolet ray absorption spectrum: maximum absorption $\lambda_{max.}^{MeOH} = 311$ m$\mu$; absorbance $E_{1\,cm.}^{1\%} = 2180$ Anti-trichomonas activity: minimum inhibitory concentration against *Trichomonas vaginalis* No. 4F: 0.062 mcg./ml.

What we claim is:
1. Antibiotic T-24146, characterized by the following properties:
   (1) melting point: 168 to 173° C. (decomposition);
   (2) elementary analysis: C, 71.16 to 72.68; H, 6.41 to 7.01; N, 2.35 to 2.67; O, 17.11 to 18.48;
   (3) molecular weight:
      (a) vapor pressure osmosis method: 535±50 (in ethyl acetate);
      (b) titration method: about 550 [in a solution of dimethylsulfoxide-water (7:2)];
   (4) specific rotation: $[\alpha]_D^{25} = +872°\pm80°$ (C=0.5% in chloroform);
   (5) ultraviolet ray absorption spectrum:

$\lambda_{max.}^{MeOH}$: about 310 m$\mu$, more particularly 309 to 310 m$\mu$;

$E_{1\,cm.}^{1\%}$: 1779 to 2180;

(6) infrared absorption spectrum (in KBr): the principal significant absorption bands in wave numbers (cm.$^{-1}$) are as follows: 3470, 3340, 3000, 2910, 1650, 1610, 1510, 1450, 1385, 1300, 1250, 1218, 1175, 1125, 1040, 987, 960.

2. A method for the production of antibiotic T-24146, which comprises culturing *Streptomyces viridochromogenes* ATCC 21765 in a culture medium containing an assimilable carbon source and a digestible nitrogen source under aerobic conditions for 2-5 days at a pH of about 5-9 and a temperature of about 20-45° C. to accumulate the T-24146 antibiotic in the culture filtrate and in the mycelia, and recovering the accumulated T-24146 antibiotic therefrom.

3. A method according to Claim 2, wherein the antibiotic T-24146 is recovered from the culture filtrate.

4. A method according to claim 2, wherein the antibiotic T-24146 is recovered from the mycelia.

References Cited

Miller: The Pfizer Handbook of Microbia Metabolites, McGraw-Hill Book Co., Inc., New York, N.Y., 1961, p. 125.

JEROME D. GOLDBERG, Primary Examiner

U.S. Cl. X.R.

195—80